Patented July 21, 1942

2,290,415

UNITED STATES PATENT OFFICE 2,290,415

COMPOSITION OF MATTER AND PROCESS FOR PREVENTING WATER-IN-OIL TYPE EMULSIONS RESULTING FROM ACIDIZATION OF CALCAREOUS OIL-BEARING STRATA

Melvin De Groote, University City, Mo., assignor to Petrolite Corporation, Ltd., Wilmington, Del., a corporation of Delaware No Drawing. Original application October 11, 1940, Serial No. 360,805, now Patent No. 2,262,742, dated November 11, 1941. Divided and this application September 8, 1941, Serial No. 410,085

9 Claims. (Cl. 252—8.55)

This application is a division of my pending application for patent Serial No. 360,805, filed October 11, 1940, which subsequently matured as U. S. Patent No. 2,262,742, dated November 11, 1941.

This invention relates to the art or procedure commonly referred to as acidization of oil-bearing calcareous strata or the like, and which consists in introducing a strong mineral acid into an oil well for the purpose of causing the acid to disintegrate, dissolve, or react with the calcareous oil-bearing structure of the well, in a manner that results in an increase in the amount of crude petroleum obtained from the oil-bearing strata.

Many oil wells, after being subjected to acidization, produce emulsions, frequently of a very refractory nature, that have to be demulsified or subjected to chemical, electrical, or similar treatment, in order to recover the oil or valuable constituent of the emulsion. My invention has for its main object to prevent the formation of objectionable water-in-oil type emulsions resulting from acidization of oil wells; or stated in another way, one object of my invention is to provide a process or procedure by which the oil-bearing calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions, which often follow conventional acidization, represent a transitory, rather than a permanent situation; but even if lasting only for a few weeks, they are extremely objectionable.

Another object of my invention is to provide a now composition of matter that is particularly adapted for use in the operation of acidizing the calcareous structure of an oil well in a way to increase the amount of crude petroleum obtainable from said structure, without, however, converting said crude petroleum into an objectionable emulsion.

My new process, briefly stated, consists in causing an emulsion-preventing agent of the kind hereinafter described, to be mixed with, dissolved in, or commingled with the fluids, liquids, or liquid mixture in an oil well that has been subjected to or which is being subjected to acidization, prior to emergence of said fluids, liquids, or liquid mixtures from the well. Such emulsion-preventing agent consists of a chemical compound or condensation product obtained by polymerizing alkylolamines at elevated temperatures, and preferably, in the presence of a polymerization catalyst to produce polymers containing at least two nitrogen atoms, then reacting the resultant polymers with a number of a group consisting of carboxylic acids and alcohols containing a chain of at least 8 carbon atoms and derivatives thereof, capable of producing esters and ethers, to produce esters and ethers of said polymerized alkylolamines. Said compounds, together with a method for manufacturing the same, are disclosed in U. S. Patent No. 2,178,173, dated October 31, 1939, to Katzman and Epstein. The exact composition of the condensation products described in said Katzman & Epstein patent is unknown. For this reason many of the properties of the materials are unpredictable. It is surprising to find that such materials are stable for an extended period of time in half-concentrated hydrochloric acid or other similar mineral acids. It is likewise remarkable to note that such solutions in acid, and particularly in relatively low ratios, as hereinafter described, give a very pronounced lowering of the surface tension. This is all the more remarkable, in view of the relatively weak stability of esters, although the stability of ether linkages may well be understandable. As far as the ester linkages are concerned, it is difficult to indicate a probable structure for such compounds, which would account for their resistance to decomposition in strong acid solution.

In practising my process, the emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground. But the particular procedure, the means used to effect the mixing or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well, or the liquids, or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent along with the mineral acid, i. e., dissolved in said acid; and (c) Introducing the emulsion-preventing agent, preferably in aqueous solution, immediately after the introduction of the mineral acid.

The composition of matter that I have devised for acidizing the calcareous oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. My preference is to use hydrochloric acid whose concentration is at least equal to approximately half strength commercial 18° Bé. acid, as I have found that when such an acid is mixed with approximately 0.01% to 2.5% of the herein contemplated emulsion-preventing agent or agents, one obtains a new composition of matter that is perfectly stable and homogeneous, and which exhibits unusual properties, particularly when said acid mixture or new composition of matter is employed in the acidization of oil-bearing strata. However, I wish it to be understood that my invention, i. e., the process and composition of matter herein described, is not restricted to the use of hydrochloric acid, but instead, contemplates the use of any suitable strong mineral acid, several of which have previously been described as being usable in place of hydrochloric acid. Similarly, I wish it to be understood that the new composition of matter herein described may have other or additional uses, such, for example, as in the acidization of oil-bearing strata which do not produce emulsions. The hydrochloric acid or the like that is employed, may or may not have present other addition agents intended to make the acid particularly adapted to most localized conditions, which sometimes arise in the course of acidization. It should be emphasized that what is said hereinafter as to the utility and effectiveness of the composition of matter herein contemplated, applies with equal force and effect to the process which forms part of the present invention.

A number of problems have been involved in the introduction of strong mineral acid into oil-bearing strata of the kind containing calcium carbonate, magnesium carbonate, mixtures of same with siliceous material, or material which is dolomitic in character, and commonly referred to as calcareous structures. One problem is the prevention of corrosion, or damage to the metallic working parts of the well into which the acid is introduced. This has been overcome in various ways, such as by the use of an inhibitor. For the sake of brevity, reference is made to the following patents which give a cross-sectional view of the art related to acidization, although there are, in addition, certain other practical elements which are well known:

U. S. Patent No. 1,877,504, dated Sept. 13, 1932, Grebe and Sanford; 1,891,667, Dec. 20, 1932, Carr; 1,911,446, May 20, 1933, Grebe and Sanford; 1,999,969, Feb. 12, 1935, Wilson; 2,011,579, Aug. 20, 1935, Heath and Fry; 2,024,718, Dec. 17, 1935, Chamberlain; 2,038,956, Apr. 28, 1935, Parkhurst; 2,053,285, Sept. 8, 1936, Grebe; 2,128,160, Aug. 23, 1938, Morgan; 2,128,161, Aug. 23, 1938, Morgan; and 2,161,085, June 6, 1939, Phalen.

As has been previously stated in the acidization of oil-bearing calcareous strata or the like, it has been found necessary, in some instances, to add certain other materials or compounds which give additional desirable effects, at least, under certain conditions. For instance, hydrofluoric acid or fluorides, have been added to intensify the action of the hydrochloric acid used to treat the well. Possibly this is related to the action on siliceous matter in the calcareous structure. The reason for the addition of inhibitors has been previously indicated. Sometimes it has been desirable to add tenacious foam-producing agents, such as glue, gelatin, or the like. In other instances, reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

I have found that the materials or products which I contemplate adding to the hydrochloric acid or the like to produce my new composition of matter, or to act as an emulsion-preventing agent in my new process, do not interfere in any manner with the functional effect of other conventional acidizing addition agents. Of course, any single example may contain no additional agent at all; it may contain one or more, depending upon the particular local conditions and use. As far as I am aware, the herein-contemplated compounds which are added to hydrochloric acid, or any other suitable mineral acid, such as a mixture of hydrochloric acid and hydrofluoric acid, do not replace other addition agents which have been added for various other purposes. For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions, when an oil well is turned into production after the acidizing operation. Many oil wells are acidized without subsequently producing any emulsions; or the emulsions, if produced, are self-resolving, or readily susceptible to any moderate breaking action. However, certain wells, particularly those located in western Kansas and certain wells in Illinois, when acidized by conventional processes, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar de-stabilizing effect. Actually, in a number of instances this is not the case, and such emulsions have resulted in unusual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength, or somewhat weaker, is usually diluted with an equal quantity of water before it is used for acidization, i. e., the acid used in acidization may vary from 14% to 16.5% HCl, although acid varying in strength from 5% to 20% HCl has been employed. It is entirely feasible to add an agent to the acid as produced at the point of manufacture, thus exemplifying the composition of matter feature of the present invention. For instance, if desired, 0.02% to 5% of the contemplated agent may be added to the concentrated hydrochloric acid in manufacture. Such acid can be diluted to a suitable point before being employed in the acidization process. Thus, such concentrated acid can be diluted, for instance, half and half, so that the reagent is present in the dilute product within the ratio suggested previously, to wit: 0.01% and 2.5%. In many instances, the use of between 0.05% and 0.5% represents an acceptable average range.

In actual practice the hydrochloric acid obtained by a person or firm responsible for acidizing operations, may be used, in some instances, on oil bearing strata which do not form severe or refractory emulsions, and thus no advantage is obtained by adding a composition of the kind herein contemplated, in comparison with ordinary acid. Then too, some calcareous oil-bearing strata which produces severe emulsions, may require more or less of the agent of the kind herein contemplated than would be necessary in some other strata. For this reason, in the practical aspect, it is generally desirable to add the agent of the kind herein contemplated to the dilute acid, so as to be suitable for the specific local conditions which require treatment. The suitable range of ratios for ordinary half-strength acid has been indicated.

As has been previously suggested, one may also add to the acid intended for acidization, various other reagents or addition products of the kind described in the aforementioned list of patents, without effecting the operation of the emulsion-preventing agent that I employ, and without danger of said emulsion-preventing agent interfering with the effectiveness of such other acidization addition products. Likewise, it has been indicated that one need not necessarily employ my emulsion-preventing agent in the form of an addition agent, which is added to or mixed with the acid used in the acidizing step. Instead, my emulsion-preventing agent may be introduced in suitable aqueous solution, preferably in fairly concentrated solution, for instance, 1-5%, prior to the acidizing step, or immediately after the acidizing step. The method of introduction is, of course, any conventional method, and preferably, employs the same apparatus and procedure used for introducing the acid. For convenience, however, and in the most preferred form, my invention is exemplified by employing as an integral part thereof the composition of matter herein contemplated, to wit, hydrochloric acid or the like, containing in stable admixture, agents of the kind subsequently to be described and within the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid, or its equivalent, or they are not soluble in spent brine of the kind previously mentioned, i e., brine containing roughly the equivalent of 20% of calcium chloride, and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and may even reduce instead of increase the oil production, as compared with results obtained by ordinary acid. There are a number of other reasons not necessary to explain, which prevent ordinary demulsifiers from being effective. It is possible that the characteristic properties of the new composition of the matter herein described, make it adaptable for use in other arts with which I am not acquainted; but it may be apparent to others. It is also possible that the stable mixture of the kind described, i. e., certain agents dissolved in strong mineral acid, have other properties which I have not investigated, and in view of such properties, such mixture is particularly adaptable for the particular use herein described.

As has been stated, materials of the kind described in said aforementioned Katzman and Epstein patent are obtained from higher molecular weight alcohols or carboxy acids, and particularly, monocarboxy acids, or their functional equivalents, such as the acyl halide ester, amide, etc. The expression "higher molecular weight carboxy acids" is an expression frequently employed to refer to certain organic acids, particularly monocarboxy acids, having more than 6 carbon atoms and generally less than 40 carbon atoms. The commonest examples include the detergent-forming acids, i. e., those acids which combine with alkalies to produce soap or soap-like bodies. The detergent-forming acids, in turn, include naturally-occurring fatty acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, butyric acid, heptylic acid, caproic acid, capric acid, pimelic acid sebasic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil partially or completely hydrogenated animal and vegetable oils, such as those mentioned; hydroxy and alpha-hydroxy higher carboxylic aliphatic and fatty acids, such as dihydroxystearic acid, dihydroxy palmitic acid, dihydroxybehenic acid, alphahydroxy capric acid, alphahydroxy lauric acid, alphahydroxy myristic acid, alphahydroxy cocoanut oil mixed fatty acids, alphahydroxy margaric acid, alphahydroxy arachidic acid, and the like; fat.y and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroabietic acid; aralkyl and aromatic acids, such as benzoic acid, Twitchell fatty acids, naphthoic acid, carboxydiphenyl pyridine carboxylic acid, hydroxybenzoic acid, and the like. Other suitable acids include phenylstearic acid, benzoyl-nonylic acid, catyloxyacetic acid, chlorstearic acid, fencholic acid, catyloxybutyric acid, etc.

As has been previously indicated, one class of reactants employed as a raw material in the manufacture of the herein contemplated emulsion-preven'ing agent, is obtained from high molal alcohols. Such high molal alcohols are well known compositions of matter, and the method of producing the same is common knowledge. Briefly stated, such high molal alcohols may be alipha.ic, alicyclic, or cycloaliphatic in nature. They may be primary, secondary, or tertiary alcohols, and may be saturated or unsaturated. They may be derived from different sources. Some of the alcohols occur in nature as a constituent of naturally-occurring waxes. Such alcohols include the following: cetyl alcohol, octadecyl alcohol, arachyl alcohol, carnubyl alcohol, ceryl alcohol, myricyl alcohol, pisangceryl alcohol. Other alcohols are obtained from natural fats (vegetable or animal oils or fats) and from waxes, by reduction or other processes. Examples of suitable materials for use as reactants are tallow, sperm oil, cocoanut oil, etc. Such alcohols are frequently designated by indicating the source of fatty acids or the like from which they are otbained. Thus, they may be referred to as oleyl alcohol, stearyl alcohol, etc. The same procedure which is employed in connection with the conversion of fatty acids or their esters to alcohols, is also applicable to somewhat kindred monocarboxy acids or es'ers, such as naphthenic acid, abietic acid, and the like; and thus there are available corresponding naphthenyl alcohols, abietyl alcohols, etc. Cycloaliphatic alcohols are obtained in various ways, including reactions between a phenolic body and an alkylene oxide, such as ethylene oxide, or between a phenolate and a monochlorhydrin, or the like. Alcohols somewhat similar to abietyl alcohols, sometimes referred to as resin alcohols, are derived from resins, such as dammar, copal, etc. The alcohols may have straight chains or branch chains.

I have found it most desirable to use aliphatic alcohols, rather than cycloaliphatic or alicyclic alcohols. Moreover, I have found that the primary alcohols react much more rapidly as a rule than the secondary or tertiary alcohols. My preference is to use aliphatic primary alcohols having approximately 10-18 carbon atoms.

The condensation products employed are manufactured in the manner described in said aforementioned Katzman and Epstein U. S. Patent No. 2,178,173. It is my preference to have available a variety of polymerized alkylolamines and combine such polymerized alkylolamines with the properly selected high molal acid or high molal alcohol. The hydroxyamines employed in the heat polymerization step may include the various ones specifically indicated in said aforementioned U. S. Patent No. 2,178,173, and also products of the kind exemplified by tris(hydroxymethyl) aminomethane and secondary or tertiary amines derived therefrom, in various manners, for instance, by reaction with chlorhydrins, alkyl chlorides, and the like, particularly ethylene glycol chlorhydrin, glycerol monochorhydrin, etc.

Briefly, then, it is well known that alkylolamines or similar basic hydroxy amines, i. e., amines characterized by the fact that there is no aryl radical directly attached to the amino nitrogen atom, can be polymerized by heating to elevated temperatures, particularly in the presence of suitable catalysts. Generally speaking, the catalysts are basic materials, or materials having a basic reaction, such as caustic soda, soap and the like. Polymerized amines contain two or more amino nitrogen atoms, but the most desirable form for my purpose is the form in which there are at least three nitrogen atoms present, and not more than five nitrogen atoms. Such amines may be polymerized to the degree that the material shows surface activity, when dissolved in water, either in the form of the amine (forming a base with water, of course), or in the form of a salt, such as the acetate. For the sake of convenience, I will refer to the polymerized amines, broadly, as the polymerized product. I will refer to the form containing two nitrogen atoms as the dimeric form, and the type containing three, four, or five nitrogen atoms, as the polymeric form. When sufficiently polymerized, the product will be surface active. This means that a dilute solution, as such, or in the form of the acetate (for instance, one tenth of 1% to 1%) will foam. I will refer to such types as the highly polymerized surface-active form. In actual practice, the amine that is available most cheaply and which polymerizes most readily and which gives the most desirable type of demulsifier, is triethanolamine, particularly commercial triethanolamine, which, as is known, contains a small amount of monoethanolamine and an appreciable amount of diethanolamine. The composition of such polymerized amines is not definitely known, except that the polymerization takes place obviously by virtue of ether linkages. Examination of triethanolamine, for example, indicates that cyclic polymers could be formed or linear polymers could be formed, or polymers could be formed which involve both linear and cyclic formations.

Needless to say, since polymerization involves ether linkages, one may include a polyhydric alcohol, such as a glycol or glycerol; or one might include polyhydric alcohols containing ether linkages, such as diethylene glycol, diglycerol, triglycerol, tetraglycerol, and the like. Monohydric alcohols, of course, can be employed only to form ether linkages with a terminal hydroxyl group. Thus, one mole of triethanolamine, for example, and three moles of ethyl alcohol might not form a highly polymerized material. The principle involved, of course, is readily understood, in view of the common theory of polyfunctionality in regard to resinous or subresinous materials derived from polyhydric alcohols and polybasic acids. To produce highly polymerized materials one must have reactants which are at least bifunctional. In polymerizations of the kind described the polyhydroxylated amines are bifunctional or polyfunctional intermolecularly. Monohydroxylated amines, such as ethanolamine, or a diethylethanolamine, are in the same class as monohydric alcohols, i. e., they are monofunctional, unless, as far as the material such as monoethanolamine is concerned, the hydrogen atoms attached to amino nitrogen atom could be removed with the formation of water, with the result that instead of an ether linkage, there is a direct carbon atom, nitrogen atom bond. Thus, in the claims reference will be made to the polymerization of polyfunctional alkylol amines, the intention being to emphasize this particular feature. As has been indicated, however, monofunctional compounds, such as low molal monohydric alcohols, and certain monohydroxy amines, are acceptable to form part of the polymerized compound or composition. Furthermore, polyhydric alcohols may be employed to produce the same polymeric structures as polyhydroxylated amines. The preferred type of compound, however, is prepared without the introduction of polyhydric alcohols, such as glycerols, glycols, and the like. If desired, such particular type of preferred polymer may be indicated as being free from polyhydric low molal alcohol residues, or more broadly, free from alcohol residues, the word "alcohol" being used in the sense to refer to non-amino bodies, i. e., the glycols and glycerols, and is not intended to refer to amino alcohols, as the term is sometimes used in the description of triethanolamine or the like.

The polymerization of the basic hydroxy amines is effected by heating same at elevated temperatures, generally in the neighborhood of 200–270° C., preferably in the presence of catalysts, such as sodium hydroxide, potassium hydroxide, sodium ethylate, sodium glycerate, or catalysts of the kind commonly employed in the manufacture of superglycerinated fats and the like. The proportion of catalysts employed may vary from slightly less than one tenth of 1% in some instances, to slightly over 1% in other instances.

Needless to say, in the event the alcohol amine is low boiling, customary precautions must be taken so as not to lose part of the reactants. On the other hand, conditions must be such as to permit the removal of water formed during the process. At times the process can be conducted most readily by permitting part of the volatile constituents to distill, and subsequently subjecting the vapors to condensation. The condensed volatile distillate usually contains the water formed by etherization. Water can be separated from such condensed distillate by any suitable means, for instance, distilling with xylene, or removal of the water and subsequent removal of the xylene. The dried condensate is then returned to the reaction chamber for further use. In some instances, condensation can best be conducted in the presence of a high boiling solvent, which is permitted to distill in such a manner as to remove water of reaction. In any event, the speed of reaction and the character of the polymerized product depends not only upon the original reactants themselves, but also on the nature and amount of catalyst employed, on the temperature employed, time of reaction and speed of water removal, i. e., the effectiveness with which the water of reaction is removed from the combining mass. Polymerization can be effected without the use of catalysts in the majority of instances, but such procedure is generally undesirable, due to the fact that reaction takes a prolonged period of time, and usually a significantly higher temperature. It is noted that in the subsequent examples the final compositions of matter which are contemplated, particularly for use as demulsifiers, are preferably derived by means of water-soluble polymerized hydroxy amines as one of the reactants. Thus, all the subsequent description of polymerized hydroxy amines has been limited largely to the type which is water-soluble, and is obviously the preferred type. However, it must be recognized that polymerized hydroxy amines, particularly if polymerized for a fairly long period of time, at a fairly high temperature, and in the presence of an active catalyst, may result in a polymerization reaction which ends in a product that is water-insoluble, or substantially water-insoluble. Obviously, such water-insoluble material can be obtained more readily from a higher hydroxy amine than from a lower one. In other words, tributanolamine, trihexanolamine, trioctanolamine, etc., would yield such insoluble products much more readily than triethanolamine.

Incidentally, it also must be recognized that the speed of reaction and the degree of polymerization is affected by the nature of the vessel in which the reaction takes place. In the examples cited, it is intended that reaction takes place in a metal vessel, such as iron. However, in order to obtain the same degree of polymerization when conducting the reaction in a glass lined vessel, it is quite likely that the period of reaction would have to be increased 150–400%.

Suitable hydroxy primary and secondary amines which may be employed to produce materials of the kind above described include the following: diethanolamine, monoethanolamine, ethyl ethanolamine, methyl ethanolamine, propanolamine, dipropanolamine, propyl propanolamine, etc. Other examples include cyclohexanolamine, dicyclohexanolamine, cyclohexyl ethanolamine, cyclohexyl propanolamine, benzyl ethanolamine, benzyl propanolamine, pentanolamine, hexanolamine, octyl ethanolamine, octadecyl ethanolamine, cyclohexanol ethanolamine, etc.

Similarly, suitable hydroxy tertiary amines which may be employed include the following: triethanolamine, diethanolalkylamine, such as diethanol ethylamine, diethanol propylamine, etc. Other examples includes diethanol propylamine, etc. Other examples include diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzylethanolamine, benzyl dipropanolamine, tripentanolamine, trihexanolamine, ethyl hexyl ethanolamine, octadecyl diethanolamine, polyethanolamine, etc.

It is also known that one may have amines of the type:

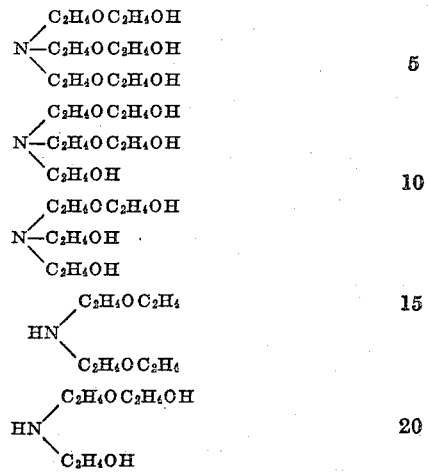

Such amines may serve as functional equivalents of the previously described amines.

Attention is directed to the fact that the alkylolamines are obtained in such a manner that they may be looked upon as being derivatives of dihydric alcohols or of the chlorhydrins of the dihydric alcohols. For example, the alkylolamines may be prepared as follows:

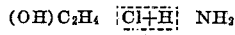

As previously stated, the C₂H₄ radical may be any one of a number of hydrocarbon radicals which are aliphatic, alicyclic, or aralkyl in nature.

It is at once manifest that similar derivatives are available from glycerols, polyglycerols, and the like, as indicated by the following reaction:

It is not necessary to point out that the same types of reactions will produce secondary or tertiary amines, and that the reaction is not limited to a combination with ammonia, but may take place with a combination of other primary or secondary amines, such as amylamine, diamylamine, cyclohexylamine, dicyclohexylamine, benzylamine, dibenzylamine, amyl cyclohexylamine, etc.

This means that in the types of material previously described, there is a wide variety of material such as monoglycerylamine, diglycerylamine, monoglyceryl diethylamine, monoglyceryl dipropylamine, diglyceryl propylamine, triglycerylamine, etc., which are functional equivalents of the various amines previously described. All that has been said here in regard to functional equivalents will be perfectly obvious without further explanation to those skilled in the art. See U. S. Patent No. 2,091,704, dated August 31, 1937, to Duncan and McAllister, and also U. S. Patent No. 2,042,621, dated June 2, 1936, to Olin.

Attention is also directed to co-pending application for Patent Serial No. 273,278, filed May 12, 1939, by Melvin DeGroote and Bernhard Keiser. Briefly stated, said co-pending application teaches, among other things, the formation of certain hydroxylated amines by means of an alcoholate derived, for example, from triethanolamine, and a chlorhydrin, such as glycerine chlorhydrin, and the like. Examples of hydroxylated amines obtained by the procedure described in said aforementioned DeGroote and Keiser application may be illustrated by the following examples:

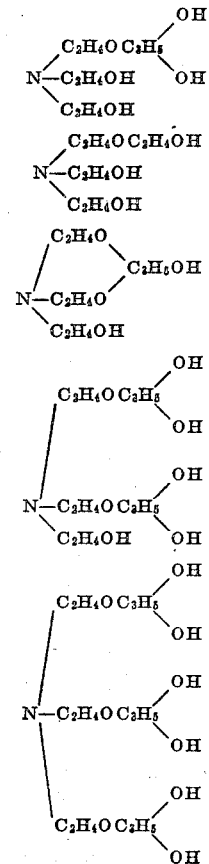

POLYMERIZED HYDROXY AMINE

Example 1

One percent of caustic soda is added to commercial triethanolamine and the product heated for approximately three hours at 245–260° C. The mass is stirred constantly, and any distillate is condensed and reserved for re-use after an intermediate running step. At the end of approximately two and one-half to three and one-half hours, the molecular weight determination shows that the material is largely dimeric.

POLYMERIZED HYDROXY AMINE

Example 2

The same procedure is employed as in the previous example, except that heating is continued for approximately another hour. In this instance the reaction mass is largely a polymeric material with an average molecular weight range indicating the presence of approximately three to four nitrogen atoms in the polymerized mass.

POLYMERIZED HYDROXY AMINE

Example 3

The same procedure is followed as in Example 2, except that a slightly higher temperature, approximately 10° higher, is employed, and a somewhat longer time of reaction, for instance, one-half to one and one-half hours longer. In any event, the reaction is continued until the product obtained either as such, or in the form of the acetate, dissolves in water (for instance, a solution varying in concentration from one tenth of 1% to 1%), and gives a foamy solution indicating high surface activity.

POLYMERIZED HYDROXY AMINE

*Example 4*

Tri-isopropanolamine is substituted for triethanolamine in Examples 1, 2 and 3.

POLYMERIZED HYDROXY AMINE

*Example 5*

Tripentanolamine is substituted for triethanolamine in Examples 1, 2 and 3.

POLYMERIZED HYDROXY AMINE

*Example 6*

Polyethanolamine of the following formula:

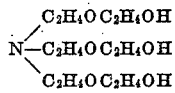

is substituted for triethanolamine in the previous examples.

POLYMERIZED HYDROXY AMINE

*Example 7*

Mixtures of the various amines previously described are made with glycerol in the proportion of two parts of hydroxy amine and one part of glycerol. One percent of caustic soda is added to the mixture and the same procedure employed as indicated in Examples 1, 2 and 3, although there may be some variation necessary to obtain the proper molecular weight range and surface activity. In any event, molecular weight determinations can be employed, as well as a foam test of the kind previously described.

POLYMERIZED HYDROXY AMINE

*Example 8*

Diglycerylamine is substituted for triethanolamine, in Examples 1, 2 and 3, previously described.

As previously stated, the preferred polymerized hydroxy amines are water-soluble, but the water-insoluble type, or substantially water-insoluble type, of the kind previously referred to, may also be employed. Furthermore, it must be remembered that the final criterion of degree of polymerization, especially in the initial stages, is dependent upon an actual molecular weight determination, rather than based on time of reaction.

As indicated in aforementioned U. S. Patent No. 2,178,173, the condensation product is readily manufactured by a heat reaction involving a polymerized alkylolamine of the kind described and the selected high molar alcohol or high molar carboxy acid, or its functional equivalent. Generally speaking, the temperature employed in condensation may approximate 160–180° C., although sometimes a higher temperature may be employed, provided it does not cause decomposition of the reactants or the products of reactants. In some cases a temperature of 200–250° C. may be employed. Condensation is best conducted in the presence of constant agitation with suitable means for elimination of the water formed during such condensation. For instance, during both the polymerization of the hydroxyamine and during the condensation process, one may pass an inert gas such as dried nitrogen, through the reacting mass. The final product may be used as such, or in the form of a base (in contact with water), or in the form of a salt, such as a lactate, acetate, or the like. It is most conveniently employed without admixture or reaction with any other product or compound, but by dilution in the mineral acid selected for acidification. The time of reaction may be comparatively short, possibly an hour or less in some instances, and may be considerably longer in others, for instance 8–10 hours. Generally speaking, 2–4 hours is more than ample for the majority of reactions; and where it is desirable to use a lower polymeric form, for instance, the dimer (see Example 1 preceding), one should employ comparatively mild conditions of reaction, i. e., a short period of time and a comparatively low temperature, in order to prevent the dimeric material from changing to a higher polymeric form prior to reaction with a selected fatty acid alcohol or the like.

In the subsequent examples the expression "pound moles" is intended to refer to the number of pounds which are numerically equal to the molecular weight.

CONDENSATION PRODUCT

*Example 1*

A polymerized hydroxyamine of the kind exemplified by Example 1, preceding, and largely dimeric in composition, is admixed with triricinolein in the following ratio: 3 moles of the dimeric polymer to one mole of triricinolein. The product is heated at a temperature of about 160–180° C. for approximately 2–4 hours until reaction is complete.

CONDENSATION PRODUCT

*Example 2*

A polymerized hydroxyamine exemplified by Examples 2 and 3 is used instead of that exemplified in Polymerized hydroxy-amine, Example 1, in the preceding example.

CONDENSATION PRODUCT

*Example 3*

Polymerized hydroxyamines of the type, exemplified by Polymerized hydroxyamine, Examples 4–8, inclusive, are substituted for Polymerized hydroxyamine, Example 1 in Condensation, Example 1, preceding.

CONDENSATION PRODUCT

*Example 4*

In the preceding examples, where polymerized hydroxyamines of the kind exemplified by Examples 2–8, inclusive, are employed, and where such polymerized materials contain at least three amino nitrogen atoms in the molecule in polymeric form, the amount of triricinolein, based on molecular proportions, is doubled.

CONDENSATION PRODUCT

*Example 5*

Teaseed oil is substituted for triricinolein in the preceding examples.

CONDENSATION PRODUCT

*Example 6*

Soyabean oil is substituted for triricinolein in the preceding examples.

CONDENSATION PRODUCT

*Example 7*

Any suitable high molal alcohol, for instance, cetyl alcohol, is substituted for triricinolein in Examples 1–4, inclusive. It is to be noted that etherization reactions require a higher temperature than the acylation reactions; and thus, when high molar alcohols are employed, it is generally desirable to use a higher temperature than 160–180° C.; and often a higher temperature range, 200–250° C. may be necessary. Three moles of high molar alcohol are used to replace one mole of triricinolein or the triglyceride of any other suitable fatty acid.

CONDENSATION PRODUCT

*Example 8*

Octadecyl alcohol is used in place of ethyl alcohol in the preceding example.

CONDENSATION PRODUCT

*Example 9*

Dodecyl alcohol is used in place of cetyl alcohol in Example 7.

It is to be noted that, although materials of the kind described can be derived from a wide variety of raw materials, my preference is to use triethanolamine as the hydroxyamine to be employed in the polymerization step. Of all the various high molar acids available, I prefer to use fatty acids, and particularly, to use unsaturated fatty acids. The preferred unsaturated fatty acid is ricinoleic acid, usually employed in the form of the triglyceride, i. e., castor oil. Where alcohols are employed, it is my preference to use alcohols having from 10–18 carbon atoms, and particularly, those derived from the reduction of fatty acids or similar alcohols derived from selected fractions of petroleum.

All the chemical compounds previously described are water-soluble as such, or when dissolved in dilute acid, or acid of the concentration indicated. Such compounds may be combined not only with mineral acids, but also with organic acids, such as acetic acid, lactic, stearic acid, or the like. For this reason they can be used without difficulty in aqueous solution as an emulsion-prevention agent by injecting such aqueous solution into the oil-bearing strata prior to acidization, or immediately after acidization. Such injection is made by conventional means, as, for example, the same apparatus or mechanical device employed for injecting acid into the well or oil-bearing strata. Furthermore, substantially all the compounds above described are soluble in hydrochloric acid of a strength corresponding to approximately 15%. Furthermore, substantially all the compounds of the type indicated are soluble in concentrated hydrochloric acid. Commercial hydrochloric acid is ordinarily available in grades from approximately 18° Bé., corresponding to approximately 28% anhydrous acid, to 22° Bé., corresponding to approximately 35.2% anhydrous acid. Some commercial hydrochloric acid is available in a strength which approximates the C. P. grade or slightly less than 37% anhydrous acid.

Needless to say, my new composition of matter can be prepared readily in any convenient form. The expression "new composition of matter" in this present instance is intended to refer to the combination or mixture obtained by combining materials described in said aforementioned Katzman and Epstein Patent No. 2,178,173, with hydrochloric acid or the like, as has been described.

The selected compound may be dissolved in concentrated hydrochloric acid without dilution. The percentages employed have already been indicated. Such a concentrated hydrochloric acid may or may not contain some hydrofluoric acid. Likewise, if desired, the emulsion-preventing agent may be dissolved in water, and such aqueous solution added to the hydrochloric acid or the like, in order to dilute the same to the desired concentration. Another procedure, of course, is to add the particular chemical compound which has been selected as the emulsion-preventing agent. The percentage of chemical compound of the kind herein described is added within the range of 0.01% to 5%.

In the hereto appended claims, reference to the use of the condensation product is intended to include the base form, i. e., the chemical combination of water, and also the salt form, such as the lactate, acetate, citrate, or the like.

Having thus described my invention, what I claim as new and desire to secure by Letters Patent, is:

1. A process for preventing water-in-oil emulsions resulting from the acidization of calcareous oil-bearing strata, which consists in introducing into the cognate fluids of a well prior to emergence, the condensation product derived by polymerizing alkylolamines at elevated temperatures, to produce polymers containing at least two nitrogen atoms, and then reacting the resulting polymers with high molecular weight alcohols containing a chain of at least eight carbon atoms to produce ethers of said polymerized alkylolamines.

2. A process for preventing water-in-oil emulsions resulting from the acidization of calcareous oil-bearing strata, which consists in introducing into the cognate fluids of a well prior to emergence, the condensation product derived by polymerizing alkylolamines at elevated temperatures, to produce polymers containing at least two nitrogen atoms, and then reacting the resulting polymers with an aliphatic alcohol containing a chain of at least eight carbon atoms to produce ethers of said polymerized alkylolamines.

3. A process for preventing water-in-oil emulsions resulting from the acidization of calcareous oil-bearing strata, which consists in introducing into the cognate fluids derived by polymerizing alkylolamines at elevated temperatures, to produce polymers containing at least two nitrogen atoms, and then reacting the resulting polymers with an alicyclic alcohol containing a chain of at least eight carbon atoms to produce ethers of said polymerized alkylolamines.

4. A process for preventing water-in-oil emulsions resulting from the acidization of calcareous oil-bearing strata, which consists in introducing into the cognate fluids of a well prior to emergence, the condensation product derived by polymerizing alkylolamines at elevated temperatures, to produce polymers containing at least two nitrogen atoms, and then reacting the resulting polymers with a cycloaliphatic alcohol containing a chain of at least eight carbon atoms to produce ethers of said polymerized alkylolamines.

5. A new composition of matter, comprising a strong mineral acid and a condensation product derived by polymerizing alkylolamines at elevated temperatures, to produce polymers containing at leas two nitrogen atoms, and then reacting the resulting polymers with high molecular weight alcohols containing a chain of at least 8 carbon atoms to produce ethers of said polymerized alkylolamines; said mineral acid in uncombined form being present on a large molal excess basis in comparison with the condensation product.

6. A new composition of matter, comprising hydrochloric acid and a condensation product derived by polymerizing alkylolamines at elevated temperatures, to produce polymers containing at least two nitrogen atoms, and then reacting the resulting polymers with high molecular weight alcohols containing a chain of at least 8 carbon atoms to produce ethers of said polymerized alkylolamines; said hydrochloric acid in uncombined form being present on a large molal excess basis in comparison with the condensation product.

7. A new composition of matter, comprising hydrochloric acid and a condensation product derived by polymerizing alkylolamines at elevated temperatures, to produce polymers containing at least two nitrogen atoms and then reacting the resulting polymers with an aliphatic alcohol containing a chain of at least 8 carbon atoms to produce ethers of said polymerized alkylolamines; said hydrochloric acid in uncombined form being present on a large molal excess basis in comparison with the condensation product.

8. A new composition of matter, comprising hydrochloric acid and a condensation product derived by polymerizing alkylolamines at elevated temperatures, to produce polymers containing at least 2 nitrogen atoms, and then reacting the resulting polymers with an alicyclic alcohol containing a chain of at least 8 carbon atoms to produce ethers of said polymerized alkylolamines; said hydrochloric acid in uncombined form being present on a large molal excess basis in comparison with the condensation product.

9. A new composition of matter, comprising hydrochloric acid and a condensation product derived by polymerizing alkylolamines at elevated temperatures, to produce polymers containing at least two nitrogen atoms, and then reacting the resulting polymers with a cycloaliphatic alcohol containing a chain of at least 8 carbon atoms to produce ethers of said polymerized alkylolamines; said hydrochloric acid in uncombined form being present on a large molal excess basis in comparison with the condensation product.

MELVIN DE GROOTE.